United States Patent [19]

Oliver, Jr. John E. et al.

[11] Patent Number: 4,592,425
[45] Date of Patent: * Jun. 3, 1986

[54] PROCESS TO REMOVE SETTLED SOLIDS FROM COMPLETION BRINES

[76] Inventors: Oliver, Jr. John E.; Arnold M. Singer, both c/o Clear Fluids, Inc., P.O. Box 275526, Houston, Tex. 27526

[*] Notice: The portion of the term of this patent subsequent to Jun. 26, 2001 has been disclaimed.

[21] Appl. No.: 665,555

[22] Filed: Oct. 29, 1984

Related U.S. Application Data

[63] Continuation-in-part of Ser. No. 310,653, Oct. 13, 1981, Pat. No. 4,456,537, and a continuation-in-part of Ser. No. 450,519, Dec. 17, 1982, Pat. No. 4,515,699, and a continuation-in-part of Ser. No. 460,173, Jan. 24, 1983, Pat. No. 4,474,240, and a continuation-in-part of Ser. No. 521,187, Aug. 8, 1983, Pat. No. 4,528,102.

[51] Int. Cl.[4] .............................................. E21B 37/00
[52] U.S. Cl. ............................... 166/312; 252/8.55 R; 252/8.55 B
[58] Field of Search .............. 252/8.5 R, 8.5 A, 8.5 B, 252/8.56, 8.55 R, 8.55 B; 210/725, 727, 728, 729; 166/312, 371

[56] References Cited

U.S. PATENT DOCUMENTS

| | | | |
|---|---|---|---|
| 2,315,734 | 4/1943 | Ralston et al. | 252/326 |
| 2,978,026 | 4/1961 | Bemis | 252/8.55 X |
| 3,025,236 | 3/1962 | Barrett et al. | 252/8.5 |
| 3,122,203 | 2/1964 | Hawkins | 252/8.55 X |
| 3,126,950 | 3/1964 | Carlberg et al. | 166/244 X |
| 3,754,599 | 8/1973 | Hummel et al. | 166/312 X |
| 3,798,270 | 3/1974 | Lee et al. | 252/8.55 X |
| 4,292,183 | 9/1981 | Sanders | 252/8.55 |
| 4,304,677 | 12/1981 | Stauffer et al. | 252/8.55 |
| 4,456,537 | 6/1984 | Oliver et al. | 252/8.5 X |
| 4,515,699 | 5/1985 | Oliver et al. | 252/8.55 |

Primary Examiner—Herbert B. Guynn
Attorney, Agent, or Firm—Vaden, Eickenroht, Thompson & Jamison

[57] ABSTRACT

Drilling fluid solids (mud, solids and oil) can be removed from completion/packer brines in a well system by employing a small effective amount of an aliphatic alcohol and a surface active chemical aid mixed with the contaminated brines. Under some conditions, the brine can become recontaminated in a well with a small amount of solids which settle to the production zone in the well bore. These settled solids obscure acoustic logging and plug perforations into the production zone. These settled solids are removed by spotting a chemical aid in selected volume and concentration. These solids now become buoyant and rise upwardly in the well bore leaving in the well the production zone with clean solids-free brine. As a result, the entire volume of brine does not require treatment.

9 Claims, 4 Drawing Figures

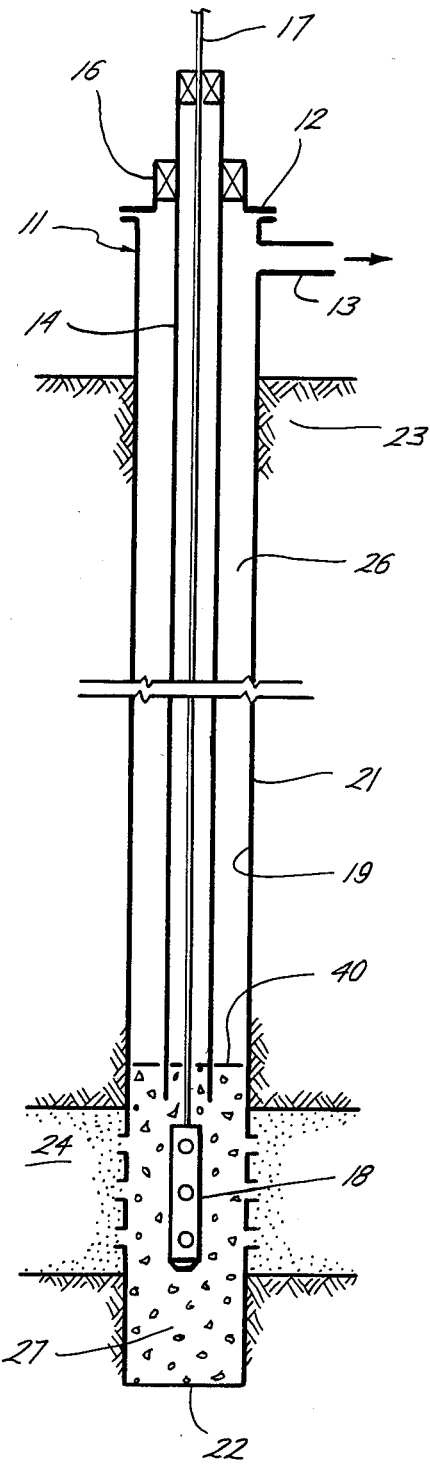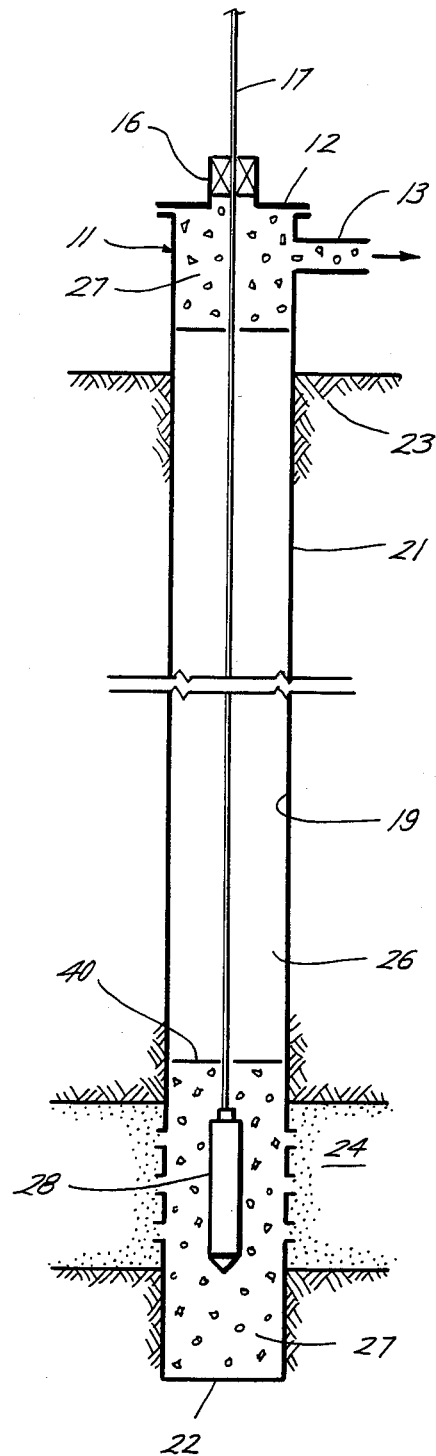

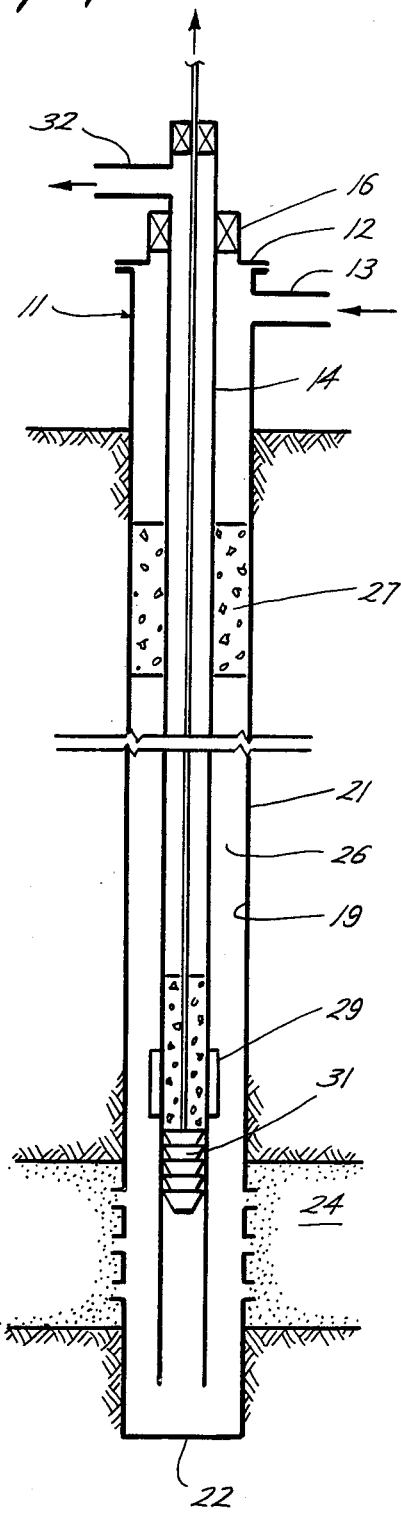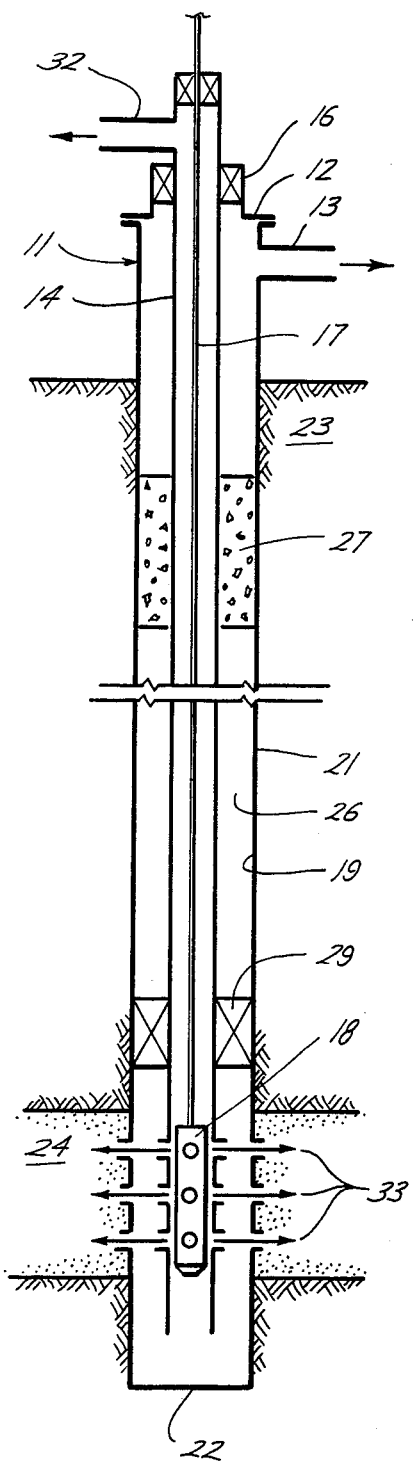

PROCESS TO REMOVE SETTLED SOLIDS FROM COMPLETION BRINES

RELATED APPLICATION

This application is a continuation-in-part of application Ser. No. 310,653, filed Oct. 13, 1981, now U.S. Pat. No. 4,456,537 and copending Ser. No. 450,519, filed Dec. 17, 1982, now U.S. Pat. No. 4,515,699 both entitled "Chemically Cleaning Drilling/Completion/Packer Brines, and Ser. No. 460,173, filed 01/24/83 and entitled "Drilling Fluid Displacement Process" now U.S. Pat. No. 4,474,240, and Ser. No. 521,187, filed Aug. 8, 1983 and entitled Chemically Cleaning Drilling/Completion/Packer Brines now U.S. Pat. No. 4,528,102, all by the present inventors.

BACKGROUND OF THE INVENTION

1. Field of the Invention

This invention relates to the use of high and low density brines in well bores, and it more particularly relates to the removal of solids, e.g., drilling residue and mud and solids and oil from such brines.

2. Description of the Prior Art

Aqueous brine solutions of high density are used in well bores employed in the production of petroleum. These solutions have been used as both drilling, completion and packer fluids especially in deep wells subject to high formation oil and gas pressures at elevated temperatures. These brines can be formed of the sodium, potassium, calcium and zinc salts with chloride and bromide ions. These aqueous fluids may include corrosion inhibitors and other salts such as soda ash. The density of these salt type well fluids depends on the particular salt, or mixture of salts, and their concentration in the aqueous well fluid. Usually, these salt type well fluids have a density in the range of between about 8 and 19 pounds per gallon.

The salt type well fluid should be solids-free in its use as a well fluid. If there are solids in a packer or completion fluid, they can cause serious injury to a producing formation by plugging of the pore spaces therein or even of the perforations and channels provided to induce fluid flows between the formation and well bore. If there are solids in a packer fluid, the solids will precipitate with time upon the packer. As a result, these solids deposit make it difficult to disconnect the tubing from the packer with a resultant costly well workover.

A process has been developed for removing the contaminating solids from high density, salt-type (brine) aqueous drilling, completion and packer fluids before their placement into a well bore. This process is described in our U.S. Pat. No. 4,456,537 and copending application Ser. No. 450,519 filed Dec. 17, 1982, which patent and application for descriptive purposes is incorporated herein. Thus, the solids contaminated brine can be cleaned by our unique process, specifically before it enters the surface equipment of the well system.

Although the brine can be made solids-free at the rig, it is preferred to clean the well system of drilling fluid or mud solids oil, etc. before introduction of the brine into it. One of the main problem areas in removing drilling fluid is from residues in the well bore equipment which includes the tubing or well pipe and the annulus between it and the casing or surrounding well bore.

In accordance with our process described in U.S. Pat. No. 4,474,240, there is provided an improved displacement process for eliminating drilling fluid components of mud, solids and oil from well bore equipment prior to introduction of solids-free completion and packer brine. The drilling fluid is displaced from the well bore equipment by a treated water plug circulated at turbulent flow through the well bore equipment for displacing drilling fluid and other solids before it. The treated water removes residual drilling fluid and it has a novel composition of surfactant and alcohol in clean water subjected to agitation and shear mixing. After the treated water, the solids-free brine is introduced into the well bore equipment.

In other embodiments, a plug of gelled aqueous spacer can be introduced before or after the treated water. Where the drilling fluid is inverted, the spacer preferably precedes the treated water and comprises an inverted gel formed of bentone, water and diesel oil. In other cases, the aqueous spacers can contain a viscosifier polymer such as hydroxyethylcellulose (HEC). Preferably, an aqueous spacer precedes and follows the plug of treated water.

As a result, the drilling fluid, spacers and treated water leave the well bore equipment clean for the brine introduced therein in a solids-free condition. The plugs and treated water can be specially composed so that the former travel at laminar flow and the latter at turbulent flow in the well bore equipment at the same ranges of linear velocity.

In the present improved process, the brine is any solution of the mentioned salts and water, and the solids content of the brine to be treated is not greater than 1-2 percent by weight depending on the brine's density and the specific gravity of the solids. Greater amounts of solids should be removed by retreating the brine by the Dirt Magnet ® Process of the U.S. Pat. No. 4,456,537 and copending application Ser. No. 450,519, filed Dec. 17, 1982.

The contaminating solids are usually introduced into the well bore by inadvertent passage of the solids-free brine through uncleaned "dirty valve or pumping conduit" which had relatively large residual amounts of drilling mud or like solids. Once these solids enter the well bore, they would settle to the bottom of the well bore. These settled solids if adjacent a production zone of interest create undesired problems relative to completion procedures such as acoustic logging and perforation techniques. For example, the solids shield or obscure the camera-like picture of acoustic logging. Most importantly, these settled solids will enter perforations, especially as they are made, to seal or plug channels in the production formations. Other problems from the settled solids will be apparent to those working in these art areas.

The present improved process removes the settled solids from the brine at the production zone of interest without reprocessing the entire brine within the well bore.

SUMMARY OF THE INVENTION

In accordance with this improved process for a clean brine in a well bore containing a small amount of settled solids, there is spotted in these settled solids of a chemical aid in a selected volume and concentration relating to the amount and type of solids. As a result, these solids are made buoyant in the brine. The buoyant solids are allowed to rise upwardly in the well bore away from the production zone of interest. Then, the completion operations can be practiced at the bottom of the well bore in solids-free brine.

DESCRIPTION OF DRAWINGS

The several Figures in like schematic show a well bore subject to treatment by the present improved process to remove settled solids from a bottom production zone of interest;

FIG. 1 shows the settled solids obscuring an acoustic logging tool suspended by a wireline;

FIG. 2 shows the well bore of FIG. 1 with the settled solids raised to the top of the well bore;

FIG. 3 shows application of this process to a well bore containing a casing isolated by a packer and a wireline perforating gun operated in clean brine; and FIG. 4 shows a view similar to FIG. 3 but before the casing has the packer set and a swab operated by a wireline is removing buoyant solids.

In these several Figures, like elements carry like numerals to simplify the present description.

DESCRIPTION OF PREFERRED EMBODIMENT

Referring to the drawings, and particularly to FIG. 1, there is shown a well system 11 which includes a surface well head 12 with a mud flow line 13. The well head 12 suspends tubing 14 and carries a lubricator 16 through which passes a wireline 17 in its suspension of perforating gun 18. The well bore 19 is shown completed full depth with casing 21 from the well head 12 to the bottom 22. The well bore 19 extends through non-productive formation 23 and traverses a producing strata 24.

The well bore 19 is completed with a brine 26 both in the casing 21 and the annulus thereabout within the casing 21. For example, the brine 26 has been contaminated with a small amount (e.g., 1-2% by weight) of drilling mud solids 27 which have come to rest at the bottom of the well bore 19. These settled solids 27 extend upwardly from the bottom 22 across the production zone of interest, i.e., the strata 24. If the gun 18 were to be operated, the resultant perforations of the casing 21 and surrounding strata 24 would be filled with the settled solids. Thus, the production of petroleum via such solids-filled perforations would be severely restricted. If an acoustic logging tool, such as a sonic-type camera, were substituted for the gun 18, the settled solids would mask out the well bore and prevent receiving a usable picture of the uncased formations.

The present improved process can be practiced on the well system 11 with the tubing 14 in place or removed (as seen in FIG. 2).

A selected concentration and volume of the chemical aid is introduced as a "pill" or volume spotted directly into the settled solids. The chemical aid is a special mixture of surfactant and alcohol, and it will be described in more detail hereinafter. However, the concentration and volume of the chemical aid introduced directly into the settled solids is related to their characteristics (especially density) such that the settled solids become buoyant in the brine 26.

The amount of the chemical aid is not large, and based upon the settled solids, it can be of a concentration in volume not greater than 3% and a 2% concentration usually works well. The desired volume of the chemical aid, at the selected concentration, can be introduced into the settled solids 27 in any desired manner. For example, an injector device 28, as shown in FIG. 2, can be placed, on the wireline 17. The device 28 can contain the desired volume and concentration of the chemical aid. Upon an electrical downhole signal, the device 28 releases the treated water as a "pill" directly into the settled solids 27.

The settled solids 27 can be detected at their interface 40 with the brine 26 by a wireline camera substituted for the perforation gun 18. Also, a wireline carried sampling tool can be used to take an aliquot of the settled solids 27. Thus, the volume and composition of the settled solids 27 can be determined. Now, the volume and composition of the chemical aid can be arranged (e.g. laboratory testing) in relationship to the settled solids so they become buoyant and rise upwardly in the well bore.

If desired, the wireline tools and tubing 14 are removed from the casing 21 so that the entire bulk of the settled solids 27 rises upwardly in the well bore to below the well head 12. Now, the settled solids 27 can be removed via the mud flow line 13 for suitable disposal as in the cuttings treating equipment (e.g., the screen and shake shakers).

With the lower portion of the well bore 19 free of settled solids, the wireline 17 can be used to suspend a sonic camera or perforating tool 18 adjacent the producing strata 24 in clean brine. Thus, the completion operations can be conducted in a solids-free environment in clean brine. Naturally, lowering of the tool 18 will displace the buoyant solids 27 through the mud flow line 13.

In some situations as seen in FIGS. 3 and 4, the tubing 17 will remain within the well bore 19. In this situation shown in FIG. 3, a packer 29 will not be set until the solids 27 float upwardly pass it within the casing 21. The solids 27 floating within the tubing 14 can be removed by a swab 31 or by negative brine pressure temporarily applied through the mud flow line 13, and then removed via the lubricator dump line 32.

When the buoyant solids 27 are finally at the top of the well bore, the perforating gun 18 can be lowered on the wireline 17 to the horizon of the strata 24. The packer 29 can be set to seal the annulus between the tubing 17 and casing 21. Now, the gun 18 can be fired and the projectiles create the multitude of perforation paths 33, all in clean brine.

With this solids-free environment, the strata 24 can come on production in the best arrangement for optimum hydrocarbon production.

As mentioned, the volume composition and concentration of the chemical aid is adjusted to float the settled solids in the brine within the well bore.

The term settled solids as used herein, is intended to designate insoluble materials such as rust, scale, sand, barite, metal carbonates and drilling mud. Also included in this term are insoluble materials such as oils, lubricants, corrosion inhibitors and additives and other substances that act like the insoluble solids or that are carried by them through surface phenomenon, etc.

The chemical aid is comprised essentially of a small effective amount of an equal volume mixture of an alcohol and a surface active chemical, i.e, a surfactant, which mixture is introduced as a slug or pill into the brine 26. However, the volumetric ratios of alcohol and surfactant can range from about 40/60 to 60/40 without significantly effecting the desired settled solids removal. The amount of the alcohol is usually not required above 2% volume added to the settled solids. Usually, good results are obtained using alcohol amounts above about 1.5% by volume to the settled solids. In most cases, the alcohol can be used in the amount of 2% by volume and larger amounts, such as 3.0% by volume, do not seem to appreciably increase the desired settled solid removal results. Usually, the solids removal results decrease when the amount of the alcohol is decreased substantially below the 1.0% by volume level to the settled solids.

The amount of the surfactant is usually not required above 3% by volume in the chemical aid added to the settled solids. Good results are obtained by using surfactant in amounts above about 1.5% by volume. In most cases, the surfactant can be used in the amount of 2.0% by volume and larger amounts, such as 3.0% by volume, do not seem to appreciably increase the desired solid removal results. Usually, the settled solids removal results decrease when the amount of the surfactant is decreased substantially below the 1.0% by volume level. Large amounts (e.g., above 3% by volume) of the surfactant increases the amount of brine trapped in the removed solids. The particular surfactant appears to change the surface tension of the boundary film surrounding the negatively charged solid particles, and especially the bentonite constituents from drilling muds. This effect provided by the surfactant is primarily the function in agglomeration of the solids mass from the fluid.

It has been found that, as to the settled solids, the minimum effective amounts of the alcohol and surfactant depend upon their activity nature and the particular settled solids in the brine. Thus, this minimum effective amount is emperical and there does not seem to be a determinable relationship in these amounts in a mixture between a particular alcohol and a certain surfactant from the groups hereinafter defined. This mixture does appear to immediately attack, coat, facilitate and agglomerate on contact the insoluble settled solids in the brine 26.

The spotting of the chemical aid into the settled solids 27 usually provides sufficient mixing thereinto of the alcohol and surfactant. In a short period of time, the solids are converted by agglomeration into a buoyant gel-like mass which then rises upwardly in the well bore 19 through the clean brine. This buoyant mass of solids is relatively stable but can be redispersed if subject to remixing operations. The brine 26 after removal of the buoyant mass of solids is substantially solids-free, especially of particle sizes greater than 5 microns in maximum dimension.

The alcohol can be an alcohol with between 5 and 14 carbon atoms.

Various alcohols within this range can be used usually they will be in the range of between 6 and 12 carbon atoms. The lower alcohols (e.g., hexanol and 2-ethyl hexanol) usually give good results in producing floating agglomeration of solids in brine whereas, the high alcohols (e.g., trimethyl pentanol) produce an agglomeration of solids that might settle from the brine for a certain surfactant and brine density. These alcohols usually have a specific gravity of about 8.3 relative to water. The intermediate alcohols with between 9 and 11 carbon (e.g., n-nonyl and unidecyleric alcohols) atoms can produce an agglomeration of solids (at neutral buoyancy) that remains suspended in the brine of low density. Some experimentation is required with the alcohols between 11 and 14 carbon atoms because of their physical states can be waxy solids at the operating temperature of the liquid phase. For example, the alcohols, 1-dodecanol, 6-dodecanol and 1-tridecanol have melting points, respectively, of 24° C., 30° C. and 28° C. Alcohols with above 15 carbon atoms, such as 1-pentadecanol have elevated melting points (e.g., 43° C.) that they are solids in the liquid phase at operating temperatures and may fail to properly agglomerate the solids.

In one embodiment, the alcohol is 2-ethyl-hexanol and the surfactant is bis hydroxy ethyl cetyl amine. Each of these chemicals is used in the amount of 2.0% by volume of the settled solids. Reference may be taken to our mentioned patent and application for a more detailed description of these chemicals.

The alcohol, 2-ethyl hexanol, is also known as 2 ethyl hexyl alcohol and octyl alcohol. The chemical abstract service name is 1-hexanol, 2-ethyl. This alcohol can be obtained from sources of specialty solvents, and its slow evaporation rate and solvency make it useful in the present process. It has low water solubility and low surface tension properties which are an advantage in readily separating from the brine being cleaned of solids. A good source for this alcohol is the suppliers to the producers of plasticizers for vinyl resins. Obviously, the alcohol does not need to be of chemical purity but usually will be 99.0% by volume of pure alcohol with slight amounts of organic acids and aldehydes that do not interfere in this process. The 2-ethyl hexanol can be obtained commercially from Tenneco Chemicals, Inc., and it has a relatively high COC flash point of 183° F., with a specific gravity of about 0.83 at 77° F.

The surfactant usually includes a carrier solvent such as a small amount of an aromatic hydrocarbon, corrosion and pitting inhibitor, and other additives desired to be added to the aqueous fluid. The surfactant should have a molecular weight in the range of about 150 to about 500 with predominant hydrophobic characteristics. The surfactant is selected from the group comprising amines, amides and amide oxides wherein the amine, amide and amide oxide have an alkyl group with between 8 and 18 carbon atoms. Good results can be obtained with surfactants that have a molecular weight of the surface active amine in the range of from about 150 to about 500, and with predominate hydrophobic characteristics.

Various amines can be used in this process. For example, the alkynol amines which are available under the Acquiness trademark can be used, such as Acquiness MA401A. It is understood that this amine is principally bis hydroxy ethyl cetyl amine.

Other examples of amines usable in this invention are cocoamine, octylamine, dioctylamine, decylamine and dodecylamine. Cocoamine may be generally represented by the formula $CH_3(CH_2)_{10}CH_2-NH_2$ and it is prepared from monoethenoid fatty acids derived from coconuts. The "coco" group $C_{12}H_{25}$ is not a group containing a specific number of carbon atoms, but is a number of individual groups containing different numbers of carbon atoms. However, the $C_{12}H_{25}$ group is in greater amount than any other group.

The cocoamine may be a condensation product, i.e., oxalkylated cocoamine such as ethoxylated cocoamine with between 2 and 15 mols of ethylene oxide. More particularly, the condensation product is formed by subjecting cocoamine condensation with a plurality of mols of ethylene oxide in a manner well known in the art. In general, the condensation product of a mol of cocoamine with between 2 and 15 mols of ethylene oxide may be employed with good results. Preferably, the condensation product is formed by condensing 10 mols of ethylene oxide per mol of cocoamine. Expressed on the basis of molecular weight, the ethoxylated cocoamine may have an average molecular weight between 285 and 860, but preferably, has an average molecular weight of about 645.

Preferably, the surfactant is the amide reaction product of a fatty monobasic acid and a secondary amine. More particularly, the fatty acid can be given the formula $C_nH_{2n+1}COOH$ wherein n is an integer between 12 and 18. The fatty acid can be selected from the group of oleic and diemirized oleic, linoleic, palmit oleic, palmitic, myristic, myrestoleic and stearic acids. The oleic acid amide products give good results.

The secondary amines are selected from normal amines that react with the fatty monobasic acids to form fatty amides that are generally used as nonionic emulsifiers.

One surfactant giving excellent results is a product of Witco Inc., and available under the trade name Witcamide 1017 (surfactant). This product is reported to be the amide reaction product of oleic acid, and diethanol amines. It has a specific gravity of 1.0 (same as water) is amber with a PMCC flash point above 200° F., and it is a product not hazardous under current Department of Labor definitions.

The particular alcohol selected may be insoluble, or only slightly soluble in the treated water.

The surfactant, depending upon its high molecular weight, is practically insoluble in the water phase (e.g., about 25 p.p.m.). As a result, the specific gravity of the surfactant and alcohol mixture can be varied from light-to-heavy relative to the insoluble solids materials, to adjust the agglomerated solids so that they float in the brine.

More particularly, selecting the concentration and/or carbon number in the alcohol and/or surfactant allows selection of the chemical aid for making the agglomerated solids buoyant in the brine 26.

If the surfactant has less than 10 carbon atoms in the alkyl group (and a specific gravity slightly less than 1.0) the agglomerated solids can be made to float in the brine dependent upon the concentration or carbon atom number actually used. Where a solvent is present in a small amount (e.g., 0.5% vol.), in the surfactant, the agglomerated solids will float in the aqueous fluid at the usual concentration of alcohol and surfactant.

For any given brine and settled solids the concentration and/or composition of the alcohol and surfactant may be varied in the chemical aid and may require some experimentation to selectively have the agglomerated solids buoyant in the brine at its operating well bore temperature. Then these solids can be removed by floatation to the well head region.

Naturally, the agglomerations of these insoluble solids selectively depends upon the concentration and/or composition of the alcohol and surfactant and any solvent employed in the present process.

The operation theory of the alcohol and surfactant in the present process could not be determined within certainty from information presently available. It is believed that the alcohol serves to attack or destabilize the dispersed solids by disrupting their electrophoretic charges, and then the surfactant acts to coat, facilitate and then agglomerate or gather the solids, and assembled oily materials, into a solids system (settling, floating or in suspension) that can be removed by careful liquid/solids phase separation techniques which do not impose shear or mixing energy during solids removal.

The present process can be used to remove solids by floatation from brine where the only physical separation system is the well bore. For this purpose, the chemical aid is adjusted in composition and concentration so that the agglomerated solids float upwardly in the quiescent brine.

The alcohol and surfactant, especially when using solvent free surfactants, and the heavier alcohols can produce the agglomeration of solids into a floating waxy-like deposit. For example, the alcohol as 6-dodecanol can agglomerate solids into a waxy floating body (using the specifically mentioned Witco surfactants). This waxy agglomerated solids can be removed from the brine (below about 30° C.) using negative brine displacement through the tubing etc.

In general, the present process can be used to remove settled solids from all types of brines in well bores. Usually, the presence of corrosion inhibitors, antipitting compounds, etc. will not create any problems in solids removal. Some of the material used in preparing drilling muds can interfere in the process, as by requiring increased amounts of alcohol, surfactant or in extending the time required for separation of the solids from the brine.

From the foregoing, it will be apparent that there has been herein described a process for removing selectively insoluble settled solids from brines in a well bore which is especially effective. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. In a well system containing an almost solids-free completion and completion and packer brine, the situation where settled solids (filtered or unfiltered) settle to the bottom of the brine in the well bore and such settled solids interfere with completion operations, the improvement process comprising:
   (a) spotting in the settled solids a chemical aid consisting essentially of an aliphatic alcohol with between 5 and 14 carbon atoms and a surfactant with a molecular weight in a range from about 150 to 500 with predominately hydrophobic characteristics, and the surfactant is selected from the group consisting of aliphatic amines, amides and aliphatic amine oxides with an alkyl group between 8 and 18 carbon atoms used in a selected volume and concentration relating to the amount and type of solids whereby these solids are made buoyant in the brine;
   (b) allowing the buoyant solids to rise to the top of the well bore; and
   (c) practicing the completion operations at the bottom of the well bore in solids-free brine.

2. The improvement process of claim 1 wherein the surfactant is the amide reaction product of a fatty monobasic acid with a secondary amine and the alcohol is 2-ethyl hexanol.

3. The improvement process of claim 2 wherein the surfactant is the reaction product of oleic acid and diethanolamine.

4. The improvement process of claim 1 wherein the well bore is enclosed by well casing and the buoyant solids are removed via the mud flow line provided in the well system.

5. The improvement process of claim 1 wherein the well bore is enclosed by well casing and contains tubing when spotting the chemical aid in the settled solids.

6. The improvement process of claim 5 wherein the tubing is removed from the well bore during the interval required for the buoyant solids to reach the upper portion of the casing containing the mud flow line.

7. The improvement process of claim 4 wherein the buoyant solids are displaced via the mud flow line by introduction into the casing during the completion operation.

8. The improvement process of claim 5 wherein the buoyant solids are allowed an interval of time to rise above the zone where a packer is to be set, and then the packer is set at such zone isolating solids-free brine below the packer.

9. The improvement process of claim 8 wherein completion tools are run in the casing displace any buoyant solids therein to the top of the casing for convenient removal from the well bore.

* * * * *